US012668384B2

(12) United States Patent
Milla et al.

(10) Patent No.: US 12,668,384 B2
(45) Date of Patent: Jun. 30, 2026

(54) SYSTEM FOR BULK HIGH PRESSURE PROCESSING AND RELATED METHOD

(71) Applicant: JBT Marel Corporation, Chicago, IL (US)

(72) Inventors: Jose Daniel Milla, Lakeland, FL (US); Karl Magnus Malmberg, Mjölby (SE); Ryan Pereira, Middletown, OH (US); Brandon Coles, Temple Terrace, FL (US); Philip Gregory Hebbler, Winterhaven, FL (US)

(73) Assignee: JBT Marel Corporation, Chicago, IL (US)

( * ) Notice: Subject to any disclaimer, the term of this patent is extended or adjusted under 35 U.S.C. 154(b) by 404 days.

(21) Appl. No.: 18/245,400

(22) PCT Filed: Sep. 13, 2021

(86) PCT No.: PCT/US2021/050032
§ 371 (c)(1),
(2) Date: Mar. 15, 2023

(87) PCT Pub. No.: WO2022/060663
PCT Pub. Date: Mar. 24, 2022

(65) Prior Publication Data
US 2023/0365282 A1 Nov. 16, 2023

Related U.S. Application Data

(60) Provisional application No. 63/079,221, filed on Sep. 16, 2020.

(51) Int. Cl.
*B65B 3/04* (2006.01)
*A23B 2/10* (2025.01)
(Continued)

(52) U.S. Cl.
CPC .............. *B65B 3/045* (2013.01); *A23B 2/103* (2025.01); *A23B 11/10* (2025.01); *B65B 25/001* (2013.01);
(Continued)

(58) Field of Classification Search
CPC ......... B65B 3/04; B65B 3/045; B65B 25/001; B65B 31/024; B65B 43/54; A23B 2/103; A23B 11/10; A23C 2210/15
See application file for complete search history.

(56) References Cited

U.S. PATENT DOCUMENTS 2,930,170 A * 3/1960 Holsman ................. B65B 55/10
53/88
4,182,386 A * 1/1980 Alack .................. B65G 69/182
141/93
(Continued)

FOREIGN PATENT DOCUMENTS

CN 201726833 U 2/2011
CN 103429274 A 12/2013
(Continued)

OTHER PUBLICATIONS

International Search Report and Written Opinion mailed Jan. 11, 2022, issued in corresponding Application No. PCT/US2021/050032, filed Sep. 13, 2021, 11 pages.
(Continued)

*Primary Examiner* — Nicolas A Arnett
(74) *Attorney, Agent, or Firm* — Christensen O'Connor Johnson Kindness PLLC

(57) ABSTRACT
An HPP system uses large polymer based bags (20) to increase the amount of food product or other flowable product that can fit into a HPP carrier (22). Each bag 20 has a filling fitment (24), to which a flow valve (26) can be attached. The bag (20) is inserted into the carrier (22) and
(Continued)

then the fitment (24) is manually or automatically connected to a flow valve (26). Next, the product is pumped into the bag (20) through a hose or pipe (30) which is attached to the flow valve. Thereafter, the flow valve (26) is removed and the fitment closed, and then carrier (22) together with the bag is inserted into the HPP press for high pressure processing of the product. After the HPP process, the flow valve is used to un-fill the treated product from the bag (20).

7 Claims, 17 Drawing Sheets

(51) Int. Cl.

| | | |
|---|---|---|
| *A23B 11/10* | (2025.01) | |
| *B65B 25/00* | (2006.01) | |
| *B65B 31/02* | (2006.01) | |
| *B65B 43/54* | (2006.01) | |

(52) U.S. Cl.
CPC ............ *B65B 31/024* (2013.01); *B65B 43/54* (2013.01); *A23C 2210/15* (2013.01)

(56) References Cited

U.S. PATENT DOCUMENTS

| | | | | |
|---|---|---|---|---|
| 6,070,622 | A * | 6/2000 | Rutter | B65B 55/022 141/2 |
| 6,131,766 | A * | 10/2000 | King | B67D 7/0216 222/326 |
| 6,966,741 | B2 * | 11/2005 | Gay | B65G 65/23 414/662 |
| 8,596,308 | B2 * | 12/2013 | Schrader | B65D 88/748 141/2 |
| 9,095,210 | B1 * | 8/2015 | Alspaugh | A23B 2/103 |
| 10,059,476 | B2 * | 8/2018 | Parisini | B65B 39/12 |
| 11,352,244 | B1 * | 6/2022 | Milla | B67C 9/00 |
| 2010/0012220 | A1 * | 1/2010 | Waldron | B65B 39/08 141/10 |
| 2021/0212346 | A1 * | 7/2021 | Lopez Ondevilla ... | A23B 2/001 |
| 2023/0114240 | A1 * | 4/2023 | Pelfrey | B65D 77/06 422/295 |
| 2023/0173122 | A1 * | 6/2023 | Pelfrey | A23B 2/001 422/295 |

FOREIGN PATENT DOCUMENTS

| | | | | | |
|---|---|---|---|---|---|
| CN | 106036348 | A | 10/2016 | | |
| EP | 0785151 | A1 | 7/1997 | | |
| JP | H08168515 | A | 7/1996 | | |
| WO | 03/092415 | | 11/2003 | | |
| WO | WO-2012084166 | A1 * | 6/2012 | ............ | B65D 83/62 |
| WO | 2018/111891 | A1 | 6/2018 | | |
| WO | 2020/039106 | A1 | 2/2020 | | |

OTHER PUBLICATIONS

Third Party Observation filed Jun. 23, 2022, in corresponding Application No. PCT/US2021/050032, filed Sep. 13, 2021, 2 pages.
Communication Pursuant to Article 94(3) EPC mailed Apr. 12, 2024, issued in corresponding Application No. EP 21 789 921.0, filed Sep. 13, 2021, 9 pages.
First Office Action mailed May 24, 2025, issued in corresponding Chinese Patent Application No. 202180062673.8, filed Sep. 13, 2021, 16 pages.
Second Office Action mailed Oct. 16, 2025, issued in corresponding Chinese Patent Application No. 202180062673.8, filed Sep. 13, 2021, 14 pages.
Office Action mailed Dec. 11, 2025, issued in corresponding Korean Patent Application No. 20237007219, filed Sep. 13, 2021, 21 pages.
Notice of Opposition mailed Jan. 7, 2026, issued in corresponding Application No. EP 21 789 921.0, filed Sep. 13, 2021, 13 pages.
Hiperbaric S.A., Contract 2005204R01, "High Pressure Equipment: Tilting Station," May 21, 2020, 12 pages.
Hiperbaric S.A., "Tilting Station & Rotary Table," Youtube video showing the Hiberbaric tilting platform described in the contract, <https://youtu.be/aGu6EgVSBdo>, Mar. 22, 2019, 19 pages (screenshots).
Decision of Refusal mailed Jan. 31, 2026, issued in corresponding Chinese Patent Application No. 202180062673.8, filed Sep. 13, 2021, 14 pages.

\* cited by examiner

SYSTEM FOR BULK HIGH PRESSURE PROCESSING AND RELATED METHOD

CROSS REFERENCE TO RELATED APPLICATION

This application claims the benefit of U.S. Provisional Application No. 63/079,221, filed Sep. 16, 2020, the entire contents of which are expressly incorporated by reference.

BACKGROUND

High pressure processing (HPP) is a batch processing method by which food products are subjected to very high pressure to inactivate food pathogens. Commercial HPP machines can achieve 5 log reductions in pathogens, similar to thermal pasteurization, but without the application of heat, thereby increasing the quality and taste of the food. However, there are some limitations. The food to be processed must be in the final retail package, typically an enclosed flexible bottle or film. Hard packaging like glass bottles cannot be used. This requires that final food packages must be inserted into the machine at low packing density, reducing the throughput of the machine and increasing processing costs.

HPP machines (presses), such as those made by JBT Avure and others, operate on batch cycles of 3 to 6 minutes. Plastic carriers or baskets are loaded by hand with food products already packaged into final retail form. See FIGS. 1 and 2. Pack density of liquid bottles and similar liquid containers for these carriers can be typically no higher than 45%, meaning that only 45% of the volume of the carrier is filled with product. By increasing the packing density of the carrier up to 85%, for example, capacity of the machine can be increased and processing costs can be reduced by the difference in packing density, in this case 40%. The present disclosure seeks to increase the packing density of the carriers and in particular for bottles and similar containers in their final retail form.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a system is provided for high pressure processing of a bulk, flowable product in a high-pressure processing chamber configured to receive the product in carriers. The system includes a flexible, disposable, collapsible product holding bag having a fitment for filling and emptying the bag with the flowable product, the bag sized to be receivable within the carrier with the fitment positioned to be accessible for filling and emptying the bag while in the carrier, a flow connector to connect with the fitment during filling and emptying of the bag, and the control system for controlling the filling of the bag through the flow connector and/or emptying the bag through the flow connector.

In any of the embodiments described herein, wherein the fitment extends through an opening in the carrier for attachment to the flow connector.

In any of the embodiments described herein, wherein the fitment extends through an opening in an end of the carrier for attachment to the flow connector.

In any of the embodiments described herein, wherein the fitment is at an end of the bag.

In any of the embodiments described herein, further comprising a support for supporting the carrier in tilted orientation during the filling and emptying with the bag while disposed within the carrier.

In any of the embodiments described herein, wherein the support is tiltable relative to the horizontal.

In any of the embodiments described herein, wherein the control system tilts the support system at any angle from between −90 to +90 degrees from the horizontal when filling or emptying the bag.

In any of the embodiments described herein, wherein the control system tilts the support system at any angle from between −45 to +45 degrees from the horizontal when filling or emptying the bag.

In any of the embodiments described herein, wherein the control system alters the tilt of the bag as the bag is being filled and/or as the bag is being emptied.

A method is provided for the high-pressure processing of a flowable product. The method includes placing a disposable, collapsible, product receiving bag into a longitudinally extending, high pressure processing carrier, the bag having a fitment; attaching a flow connector to the fitment; filling the bag with the product through the flow connector; processing the product in the bag within a high-pressure processing chamber; and attaching the flow connector to the fitment; emptying the product from the bag through the flow connector; using a control system to control the flow of product through the flow connector.

In any of the embodiments described herein, wherein the fitment is located at an end of the bag.

In any of the embodiments described herein, comprising extending the fitment out through the carrier when filling or emptying the bag.

In any of the embodiments described herein, comprising extending the fitment out through an end of the carrier when filling or emptying the bag.

In any of the embodiments described herein, further comprising longitudinally tilting the carrier in a first tilted position to raise the elevation of the fitment when filling the bag.

In any of the embodiments described herein, further comprising longitudinally tilting the carrier in a second tilted position to lower the elevation of the fitment when emptying the bag.

In any of the embodiments described herein, further comprising operating a control system to tilt the carrier into the first tilted position when filling the bag with the product and tilting the carrier into the second tilted position when emptying the product from the bag.

In any of the embodiments described herein, further comprising operating the control system to tilt the carrier up to 90 degrees when in first tilted position or when in second tilted position.

In any of the embodiments described herein, further comprising operating the control system to tilt one carrier up to 45 degrees when in first tilted position or when in second tilted position.

In any of the embodiments described herein, further comprising operating the control system to change the tilt of the carrier as the bag is being filled with the product and/or as the product is being emptied from the bag.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
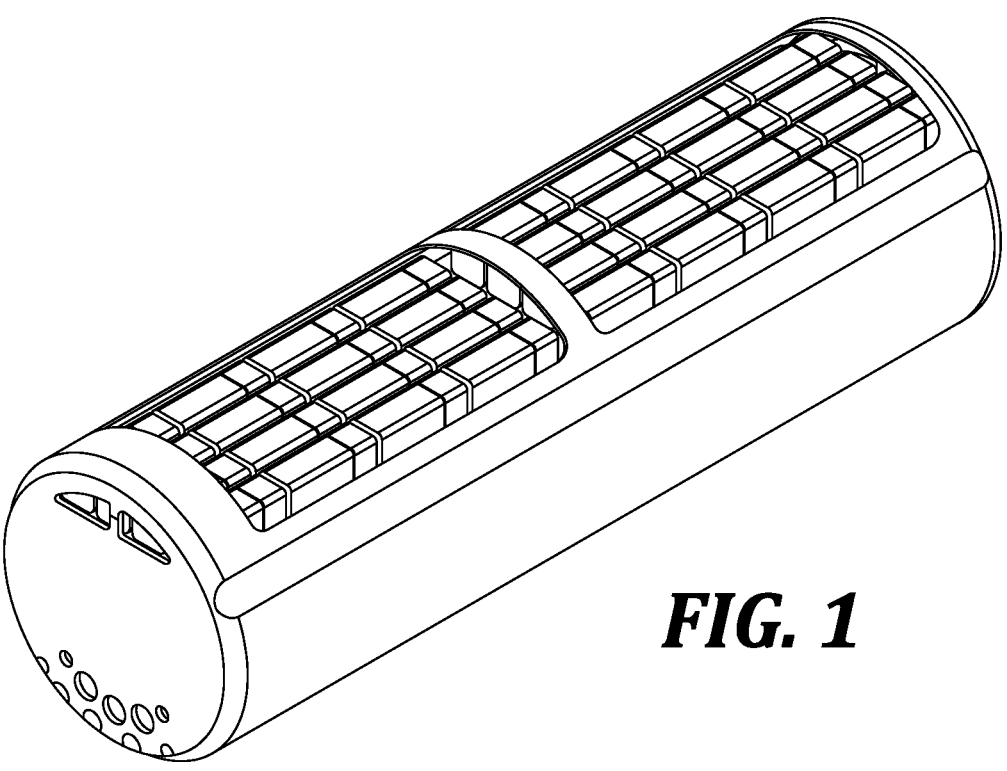
FIG. 1 discusses an HPP carrier with and product containers disposed therein.
Figure 2:
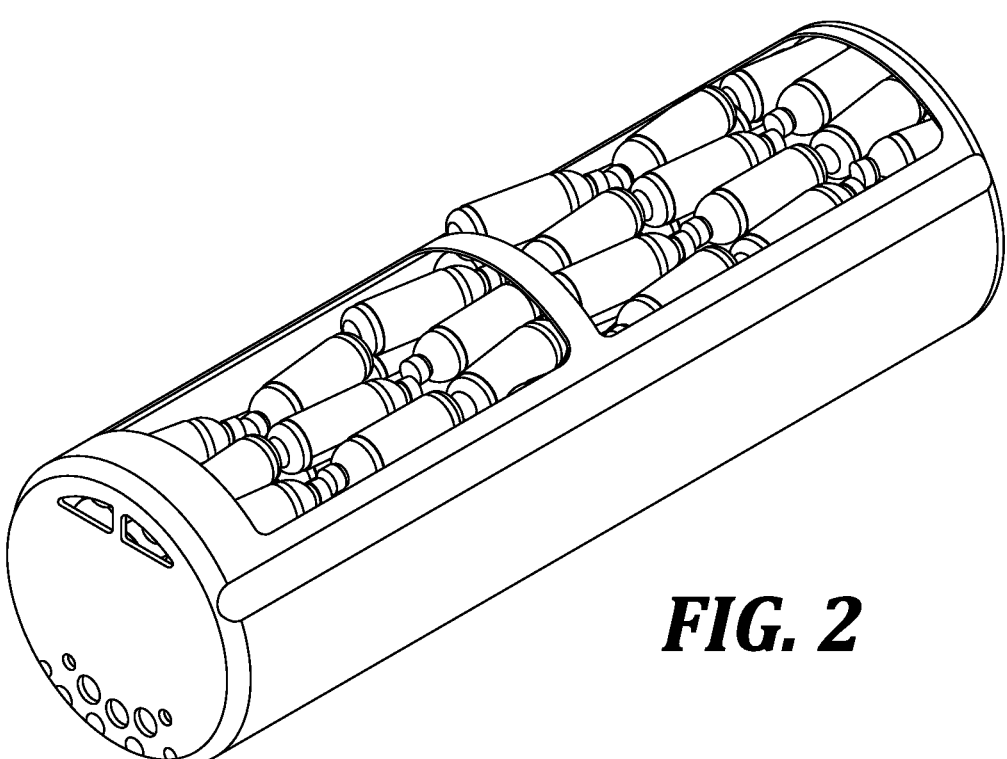
FIG. 2 is a view similar to FIG. 1, showing different product containers disposed therein.

In the following description and in the accompanying drawings, corresponding systems, assemblies, apparatus, and units may be identified by the same part number, but with an alpha suffix. The descriptions of the parts/components of such systems assemblies, apparatus, and units that are the same or similar are not repeated so as to avoid redundancy in the present application.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "processing medium" used in the HPP system for applying high pressure to the product being processed. Such processing medium is also referred to in the application as processing fluid or processing water as well as referred to as pressurized/pressure medium, pressurized/pressure fluid or pressurized water. All of these terms are to be used interchangeably.

In addition, the present application refers to the pressure vessel of an HPP apparatus. Such pressure vessel is also referred to as wire wound vessel or simply vessel. These terms are to be considered as synonymous.

Also, in the present application the term "carrier" shall generically refer to both "load basket" or "basket."

Further, the present application refers to a "product" or "products" that are subjected to or treated by HPP using the bags and carriers of the present disclosure. Such product(s) may include all manner of foods, including flowable or pumpable foods or beverages, as well as non-food products, such as cosmetics, pharmaceuticals, and organic materials and substances, wherein the control of pathogens is desirable.

The system and process of the present disclosure uses polymer based bags 20 (such as a common aseptic drum bag) to increase the amount of food product or other flowable product that can fit into a carrier 22. Each bag 20 has a filling fitment, such as fitment 24, to which a flow valve can be attached. The bag 20 is inserted into the existing standard carrier 22 and then the fitment is connected to a flow valve 26. Thereafter, the product is pumped into the bag 20 through a hose or pipe 30 which is attached to the flow valve. Thereafter, the flow valve 26 is removed and the fitment closed, and then carrier 22 together with the bag is inserted into the HPP press for high pressure processing of the product.

Such high pressure press is filled with water which serves as the pressurizing medium. Once the press has been filled and closed, high capacity pumps introduce additional water into the pressure press so that the pressure therein is increased from about 4,000 to 10,000 bar. This pressure is maintained for a sufficient length of time, from a few seconds to several minutes, to reduce the microbial load on the product being treated. The particular pressure level and the time duration of such pressure are specific to the product being processed.

When the pressure cycle is complete, the carrier 22 is removed from the HPP press and the flow valve 26, with an attached hose or pipe, is connected to the fitment 24 on the bag 20. The processed product is sucked out of the bag and pumped to a traditional filler as may be used for juices, milk, or other products.

A control system is used to control the flow of product into and out of the bag 20. This may or may not be the same control system use to control the operation of the HPP press.

Also, during the filling and emptying of the bag 20, the carrier 22 may be supported by a tiltable support structure, for example, a tilting table 34 that is able to tilt the carrier to raise the elevation of the fitment, for example, when filling the bag with product, and to lower the elevation of the fitment, for example, when removing the processed product from the bag.

Figure 3:
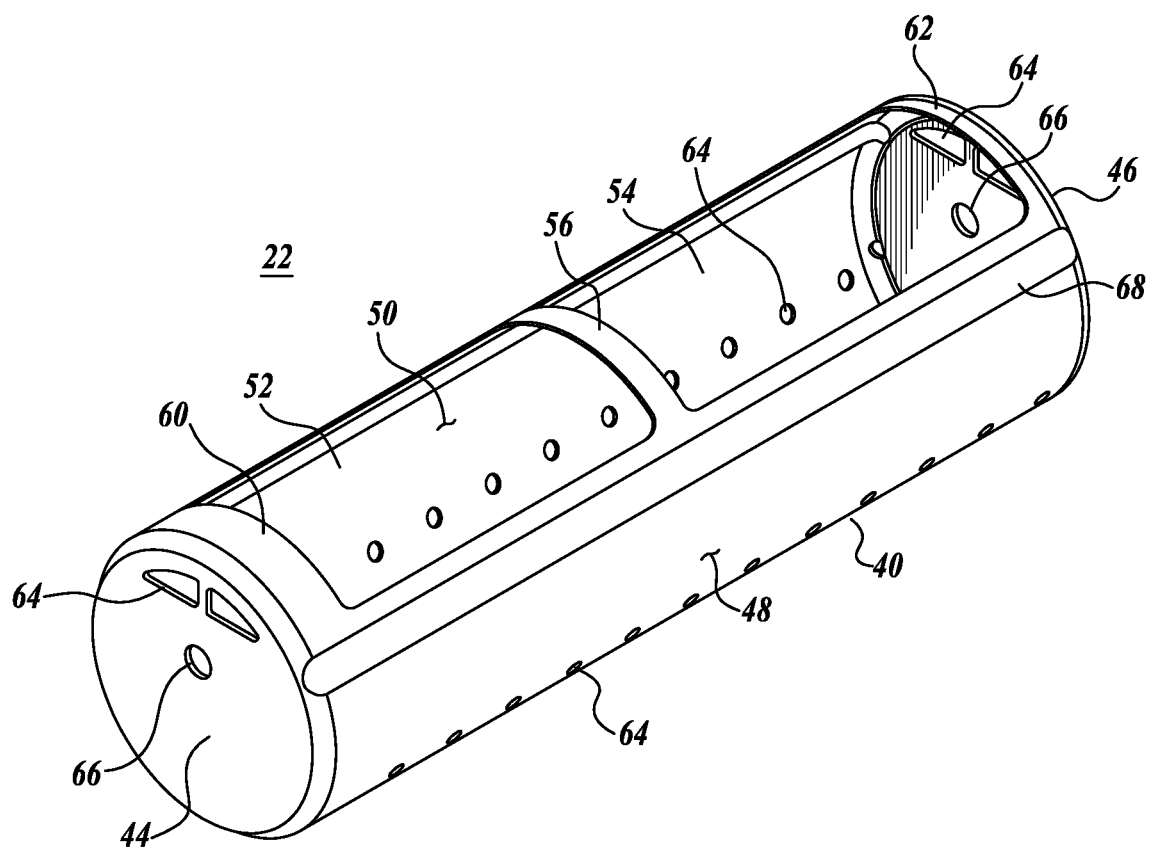
FIG. 3 is an isometric view of a product carrier for use with the present system and method.

Next, describing the present disclosure in more detail, as shown in FIG. 3, a carrier 22 for high pressure processing includes a generally cylindrical body 40 having first and second ends 44, 46 and a curvilinear sidewall 48 extending therebetween. The cylindrical body may be constructed of any material suitable for high pressure processing, whether a metal or a polymer. While the body 40 is illustrated with a generally cylindrical shape with a generally circular cross-section, the body could have different cross-sectional forms such as square, rectangular, triangular, hexagonal, or any other suitable polygonal shape. As shown, the cylindrical body 40 defines an interior volume 50 for receiving the thin walled, collapsible liner bag 20 for bulk processing.

With continued reference to FIG. 3, the carrier may include first and second top openings 52, 54 in the sidewall 48 of the cylindrical body 40, through which the bag 20 may be inserted into and removed from the carrier. As shown, the first and second top openings 52, 54 are separated by a middle bridging portion 56 of the sidewall 48, which may be used to provide a gripping point for lifting the carrier 22 or to add rigidity to the cylindrical shape of the carrier. The first and second top openings 32, 34 may terminate at or near the first and second ends 44, 46, respectively.

As shown in FIG. 3, first and second outer bridging portions 60, 62 of the sidewall 48 are provided adjacent the first and second top openings 52, 54, respectively, to assist in maintaining the generally cylindrical shape of the cylindrical body 40, and/or to also provide stiffness or rigidity to the cylindrical body. As shown, the widths of the first and second outer bridging portions 60, 62 may be different from each other. The bridging portions also may be used as a gripping point(s) for lifting or otherwise manipulating the cylindrical body 40.

A plurality of fluid passage holes 64 may be provided through the sidewall 48 of the cylindrical body 40 to allow the pressure-transmitting medium of the high pressure processing chamber to fill the interior 50 with pressure media before the pressure increase initiates. In addition, or alternatively, the fluid passage holes 64 may allow the pressure-transmitting fluid to drain out of the interior volume 30 during and/or after processing. While the fluid passage holes 64 are shown as being positioned in a bottom portion of the cylindrical body 40, it will be appreciated that the fluid passage holes 64 may be positioned at any suitable location, and in any suitable quantity.

In addition, or alternatively, auxiliary fluid passage holes 66 may be provided in at least one of the first or second ends 44, 46 of the cylindrical body 48.

Further as shown in FIG. 3, a plurality of longitudinal indentations 68 may extend along an exterior surface of the sidewall 48 between the first and second ends 44, 46 of the body 40. Such indentations provide the carrier 22 with increased stiffness and/or rigidity. Such indentations may also exist as longitudinal protrusions.

Figure 4:
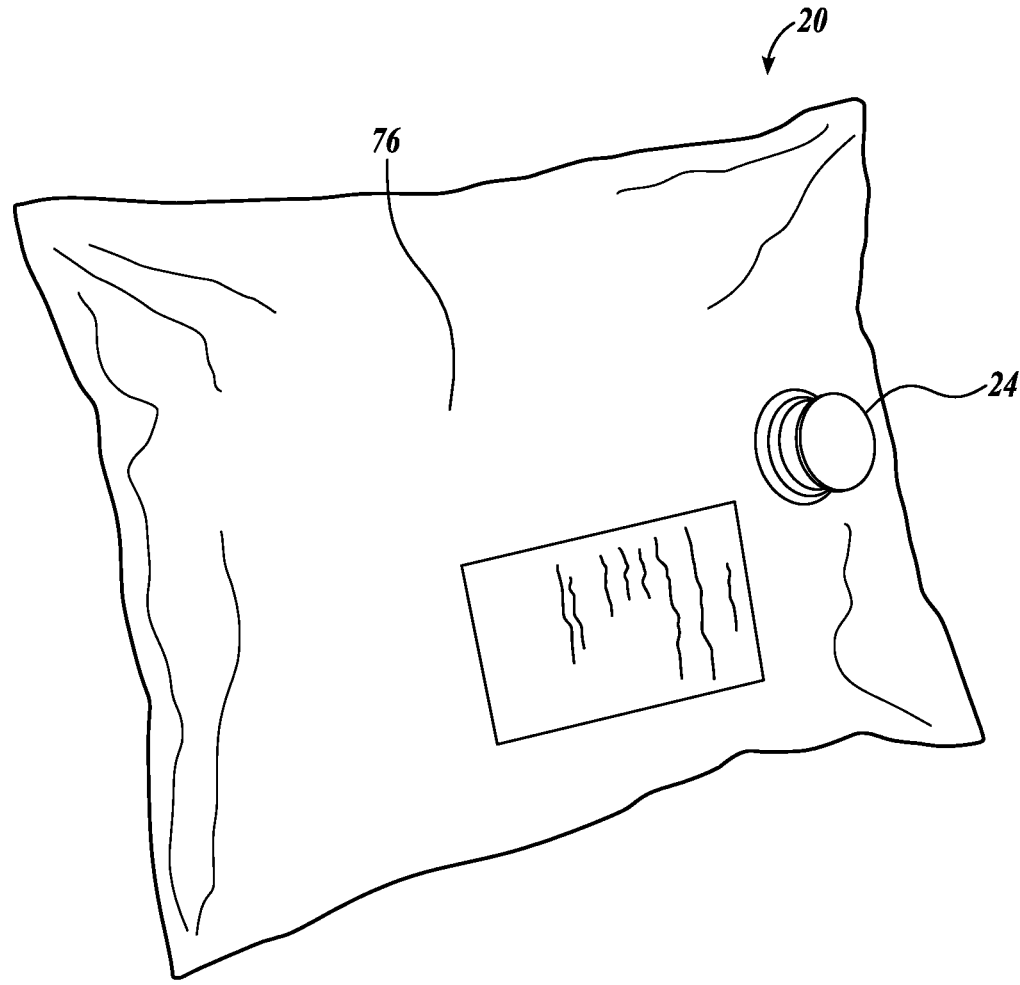
FIG. 4 shows a product bag for use in conjunction with the present system and method.

Next, referring to FIG. 4, a typical bag 20 is illustrated. The bag is generally "pillow" shaped and composed of two planar panels 76 attached together along the perimeter to form a bag configuration. The panels 76 can be of multilayer or monolayer construction. Multilayer panels can include, for example, a polymer layer and a metal (foil) layer as well as one or more additional layers of various materials. Whether constructed of a single layer or of multiple layers, the panels 76 are of lightweight, flexible, collapsible construction, while being a sufficient structural integrity to securely retain the product in the bag during HPP processing.

Moreover, the construction of the bag is such that the bag is designed to be disposable. For example, the bag may be used during a single workday or a single work shift and then disposed of. This can reduce or eliminate the need to sterilize or otherwise clean the bag so that the bag remains hygienic during use.

Although the bag 20 is shown in a generally "pillow" shaped, the bag can be of other shapes, for example, cylindrical, with appropriate seams to form the specific shape.

The bag 20 can be of various sizes, and in particular of a size to correspond to the size of the carrier 22. In this regard, the bag 20 can have a volume capacity of from about 50 liters to at least 600 liters. The structural strength of the material to form the bag 20 is sufficient to accommodate the capacity of the bag and the loads imposed on the bag during use.

As also shown in FIG. 4, the fitment 24 is positioned toward one end of the bag 20 at a location intermediate the sides of the bag. As will be appreciated, this bag construction and fitment location corresponds to off-the-shelf bags used in thermal processing of flowable materials and products. For example, bags, such as bags 20, may be sized to be placed within a standard size drama, for example, 50 gallons, and then filled with product for transportation and storage of the product. The use of a standard bag facilitates the economies of the present bulk HPP processing system and method.

Of course, the present system is not limited to using standard commercially available bags, rather bags can be configured and constructed specifically for use with the present system. For example, the product bag can be constructed with a fitment at one end of the bag so that the fitment can be accessed from the end of the carrier as shown in FIGS. 9, 10, 12, 17 and 18

Figure 5:
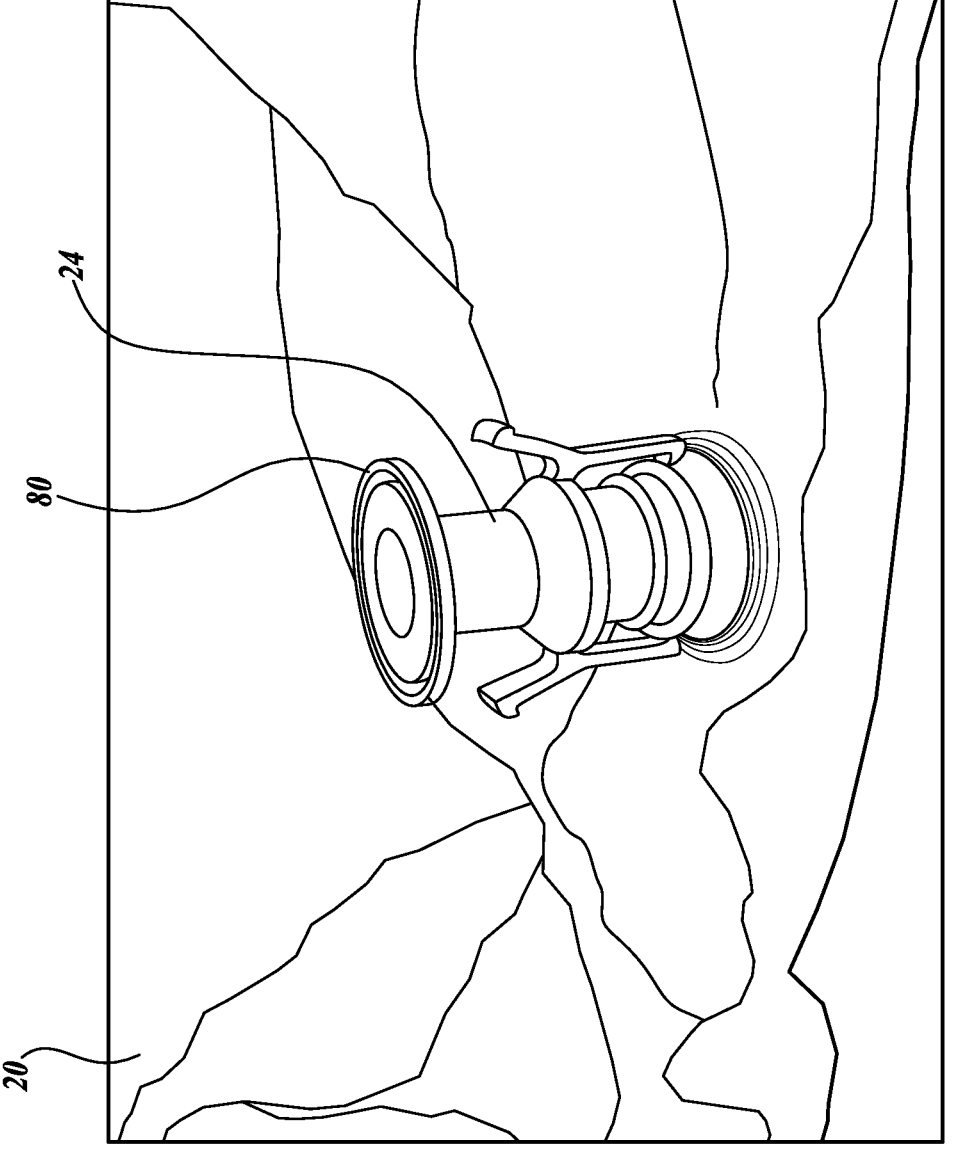
FIG. 5 illustrates a fitment for use in conjunction with a product bag.

FIG. 5 illustrates the fitment 24 used in conjunction with bag 20. The fitment is of a "press-pull" construction whereby, when the fitment is pulled or extended to the position shown in FIG. 5, the fitment is in open position to allow product to flow in and out of the bag 20. On the other hand, when the fitment is collapsed or pressed toward the opening in the bag, a valve internal within the fitment closes the internal passageway of the fitment to prevent the flow product therethrough. As shown in FIG. 5, a circular flange 80 is positioned at the distal end of the fitment to be graspable to pull the fitment into the extended position as shown in FIG. 5, and also to collapse and thereby close the fitment by pressing the flange toward the bag opening. The circular flange 80 can also serve as an attachment or interface with the flow valve 26 for secure attachment of the flow valve to the fitment 24.

Figure 6:
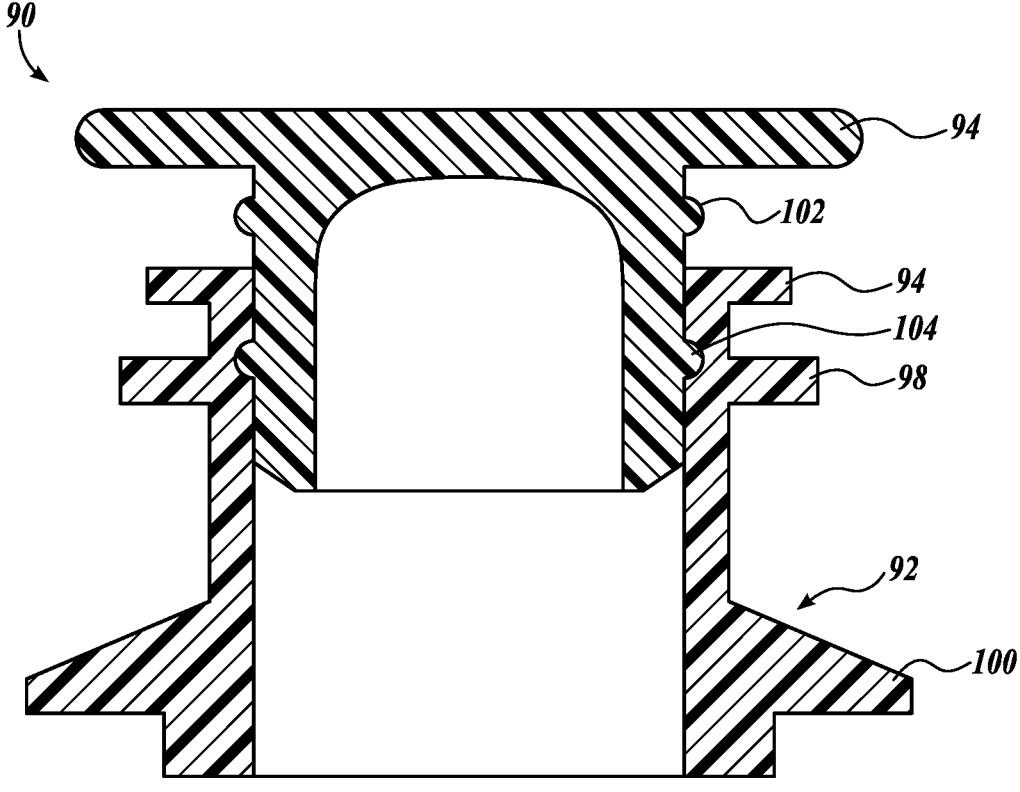
FIG. 6 is a cross-sectional view of another fitment.

FIG. 6 discloses another embodiment of the fitment 90 which is known as a "cap-style" fitment. The fitment 90 includes a body 92 and a sealing 94. The fitment body 92 may be molded from a suitable polymer material, such as high-density polyethylene. The fitment body 92 includes an upper clamping flange 96 and a lower clamping flange 98 to accommodate the clamping jaws of a flow valve or filling head. The fitment body 92 also includes a beveled clamping shoulder 100 for attachment to an opening formed in the bag 20.

The sealing 94 includes an upper contact ring 102 and the lower contact ring 104 sealing with the fitment body 92. Prior to filling the bag, as shown in FIG. 6, for example, the sealing 94 has been partially pushed into the fitment body 92 so that the lower contact ring 104 is in sealing contact with a corresponding recess in the fitment body.

FIGS. 7, 8, 10 and 16 illustrate various embodiments of flow valves 26A, 26B, 26C, 26 D connected to the fitments of bag 20. Each of the flow valves functions to connect to the fitment 24 to introduce product into the bag when filling the bag, and also connect to the fitment when emptying the product from the bag. Each of the flow valves functions as an automatic or manual control to open and close the flow valve to initiate flow to and from the bag and to terminate the flow of the product to and from the bag. Each of the flow control valves is connected to a hose 110 or tube 112 for directing product to the flow valve, and thus the bag, and for directing product from the flow valve, and thus the bag, during filling and emptying, respectively, the bag. As will be appreciated, the flow valves can be of various construction while performing the same function. In this regard, each of the flow valves includes an interface appropriate for the configuration of the fitment 24.

Figure 7:
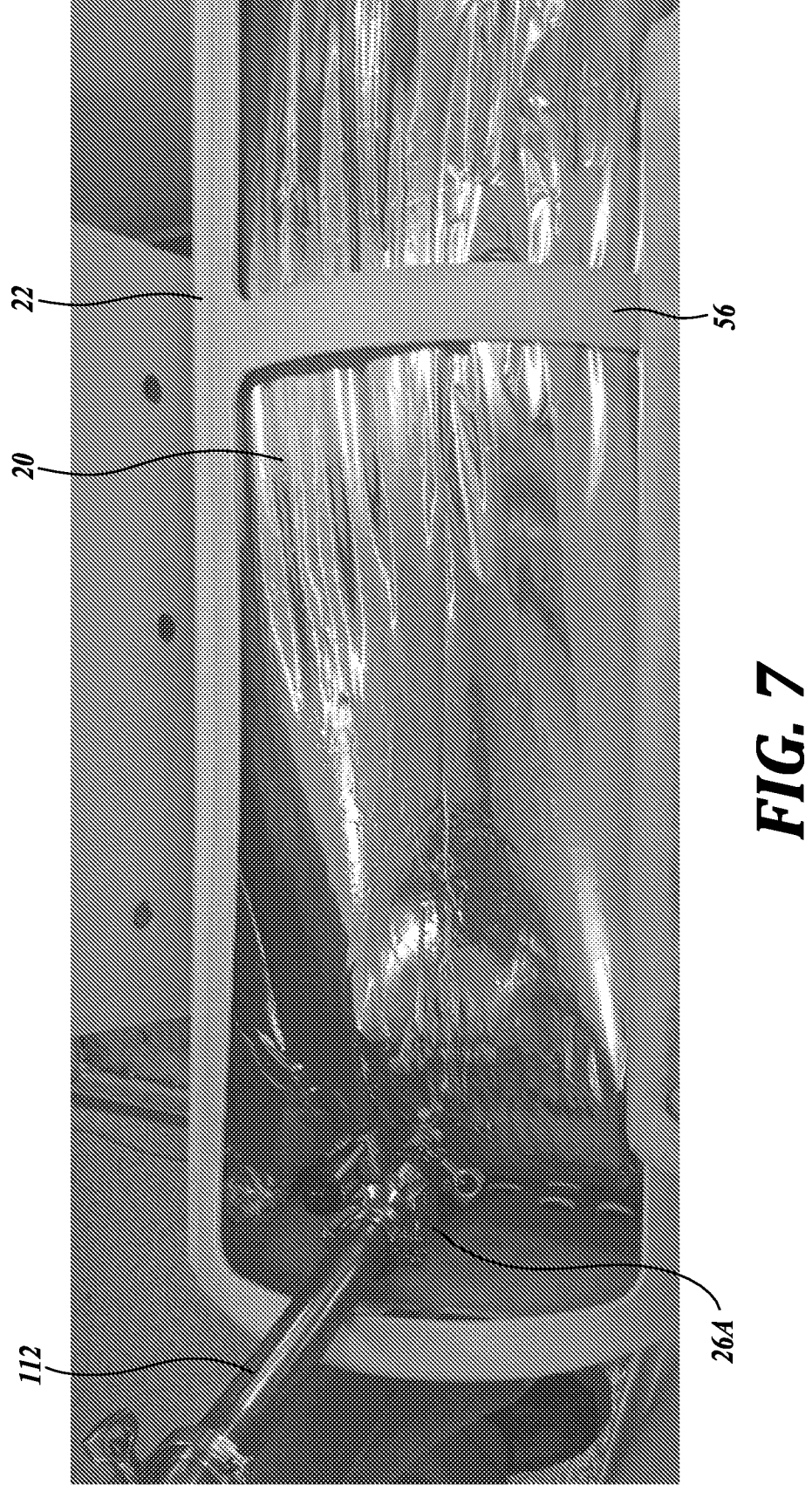
FIG. 7 illustrates a project bag positioned within the carrier with a flow valve attached to the bag fitment.
Figure 8:
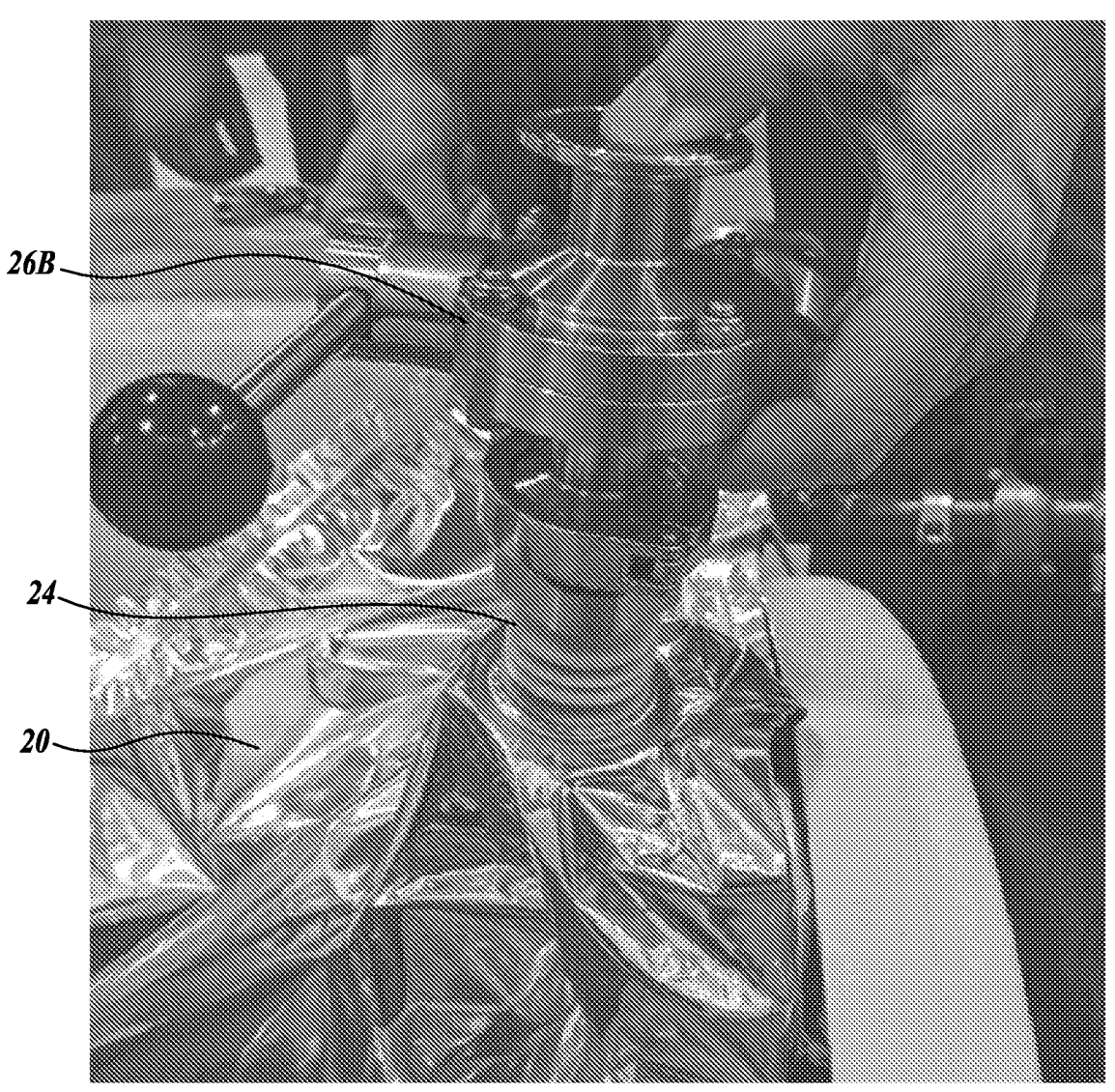
FIG. 8 shows another flow valve attached to a bag fitment.
Figure 9:
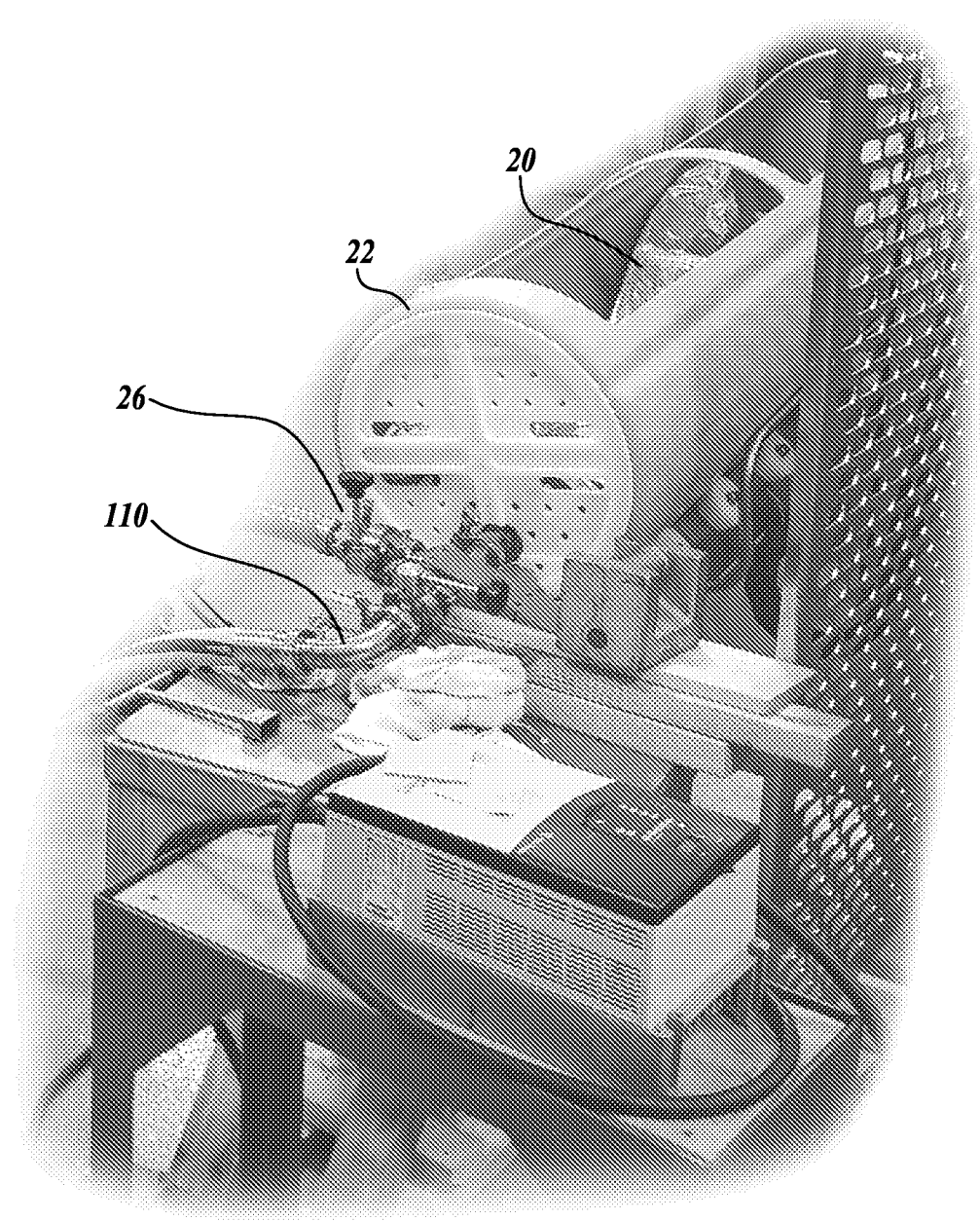
FIG. 9 shows the carrier with a product bag disposed therein and connected to a flow valve.

FIGS. 7 and 8 illustrate that access to the fitment by the flow valve 26 is through the top opening of the carrier 22. On the other hand, in FIGS. 10 and 16 the fitment extends outward from the end of the carriers 22 and 222 for convenient attachment to flow valves 26C and 26D. Such access to the fitments, such as fitments 24, is both for the purpose of filling and emptying project from the bag 20.

However, the bag 20 can be fitted with more than one fitment. For example, the fitment can be attached to both panels 76 of the bag 20 or to both ends of the bag. In this regard, when the bag is positioned within the carrier, one of the fitments will be disposed nominally upwardly and the other of the fitment's will be disposed nominally downwardly. In this regard, the fitment disposed nominally upwardly could be used for filling the bag, and the fitment disposed nominally downwardly could be used for emptying the bag. Access to the nominally downwardly disclose fitment can be through an opening formed in the end for the lower portion of the carrier.

Although in FIGS. 4, 7, 8, and 10 the fitment is shown as positioned adjacent one end of the bag 20, the fitment could be located elsewhere on the bag. For example, the fitment can be located in one corner of the bag, or centrally along a longitudinal side of the bag, or centrally relative to one of the panels 76 of the bag.

Figure 10:
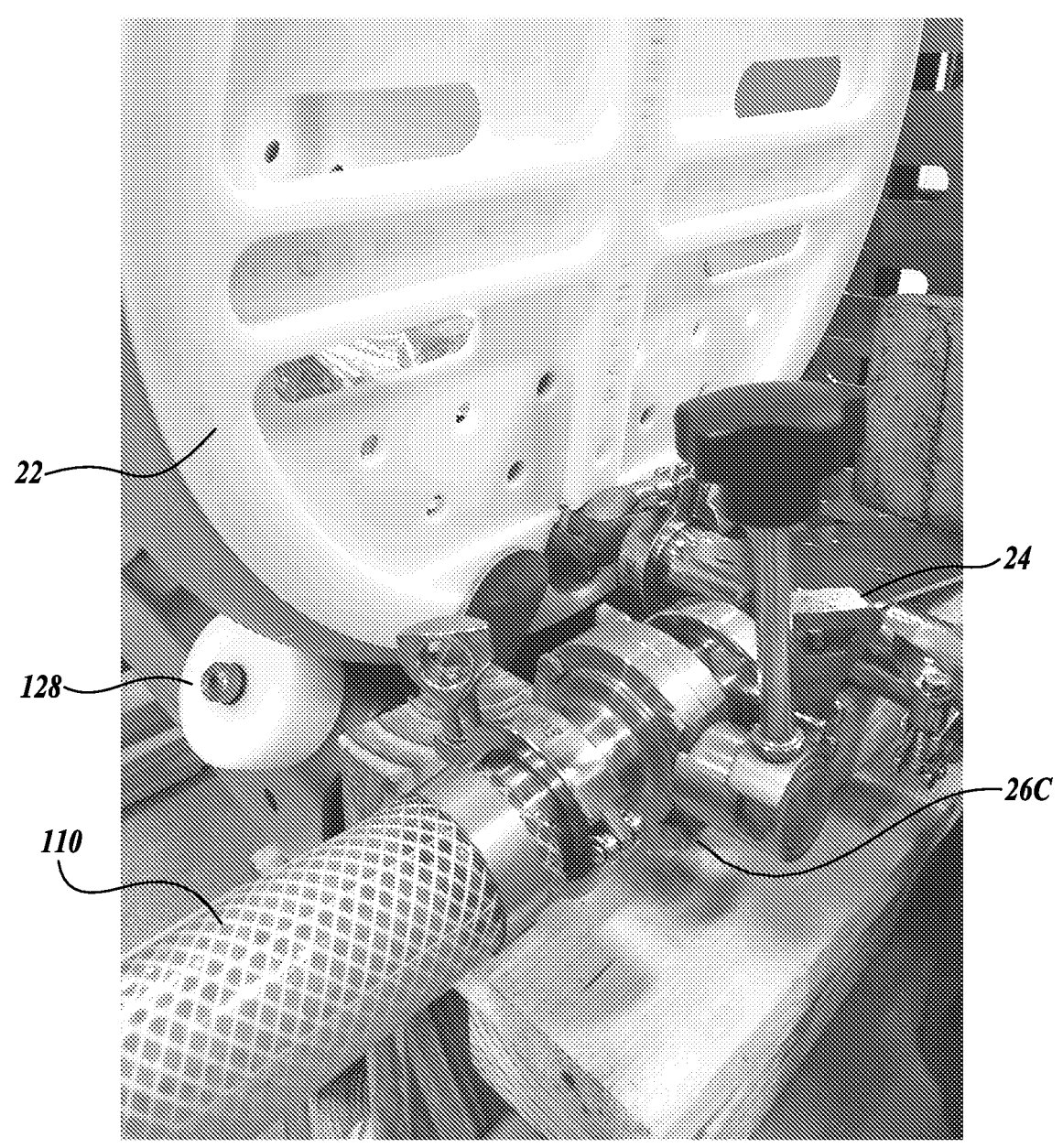
FIG. 10 illustrates another flow valve connected to a product bag fitment, with the bag disposed within an HPP carrier.
Figure 11:
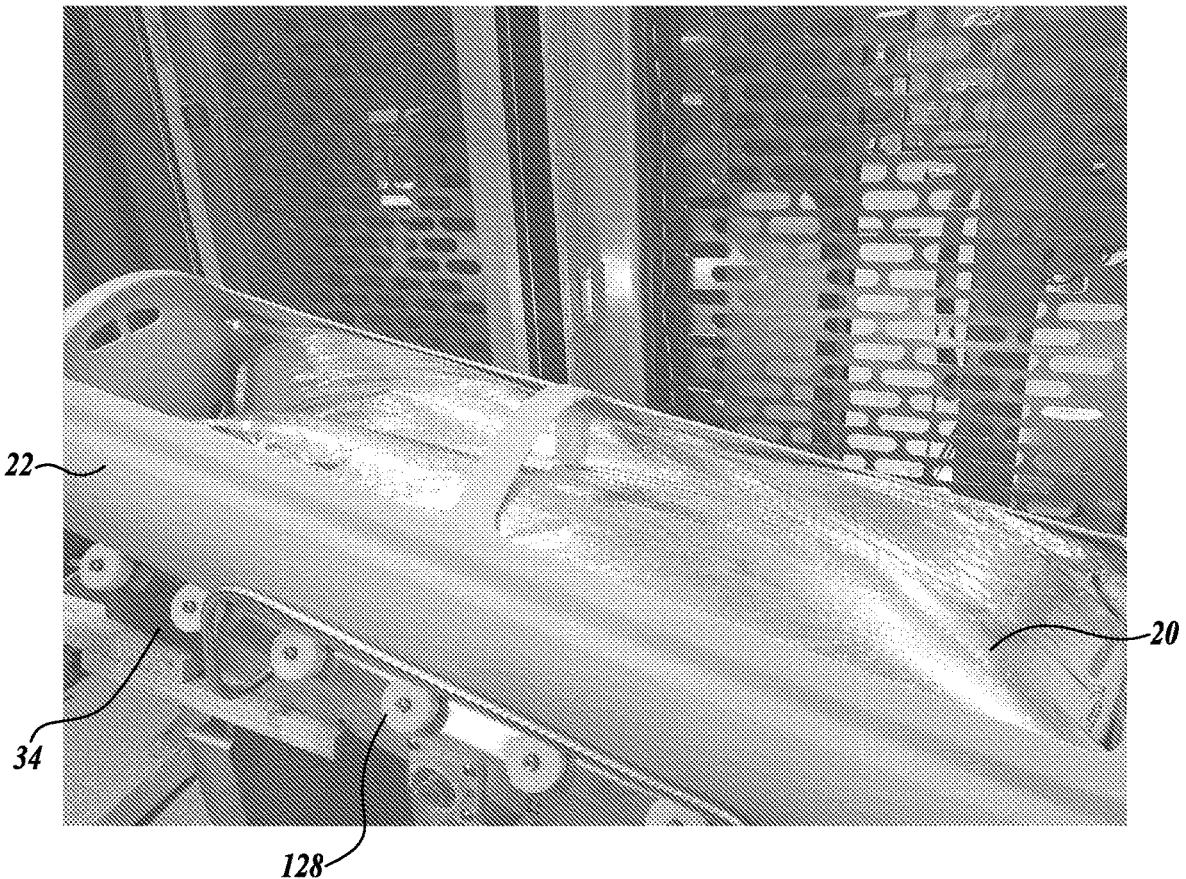
FIG. 11 illustrates a carrier disposed on a tilt table.
Figure 12:
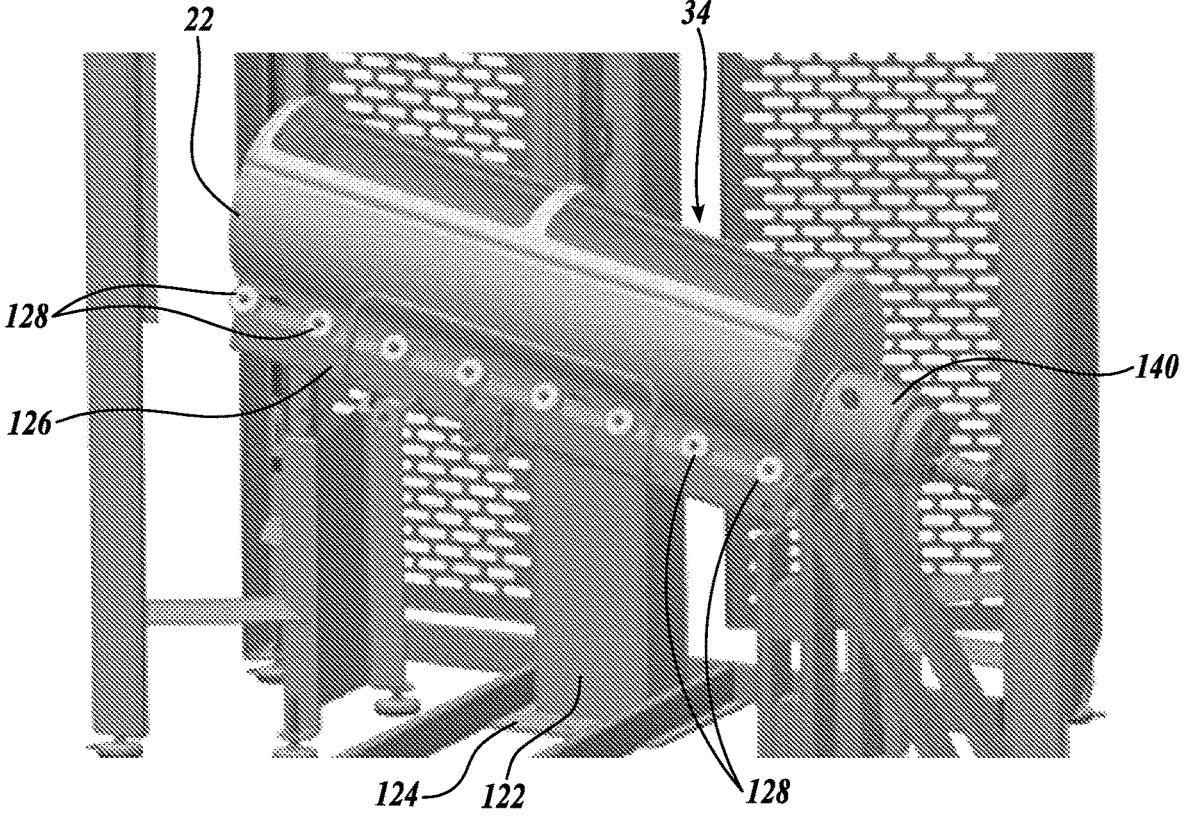
FIG. 12 is another view of the carrier disposed on a tilt table.

FIGS. 11 and 12 illustrate the carrier 22, with the bag disposed therein, is mounted on a tilting table 34. The table 34 includes a pedestal 122 extending upwardly from the base 124. A longitudinal platform or top 126 is mounted to the top of the pedestal 122 so as to be tiltable relative to its length. A series of rollers 128 are mounted along each side of the platform 126 for bearing against the exterior side portion of the carrier 22 for conveniently loading and unloading the carrier from the table 34. The control system 70 functions to control the tilt of the table platform 126. In this regard, as shown in FIGS. 10 and 12, the table is tilted so that the fitment is lowered relative to the bag, which facilitates emptying of the bag.

In FIG. 12, the flow control valve is located within a housing 140 projecting from the end of the carrier 22. In this regard, it is possible to employ one or more sterilizing fluids to pressurize the environment of the flow valve and fitment when attaching the flow valve to the fitment to empty the bag, and also while emptying the bag. The sterilizing fluids can include steam and an inert gas to maintain a hygienic environment.

It will be appreciated that the table platform 126 can be tilted in the opposite direction as shown in FIGS. 11 and 12 so that the fitment is at a higher elevation relative to its elevation when the carrier is in a horizontal position, which can facilitate the filling of the bag.

Figure 13:
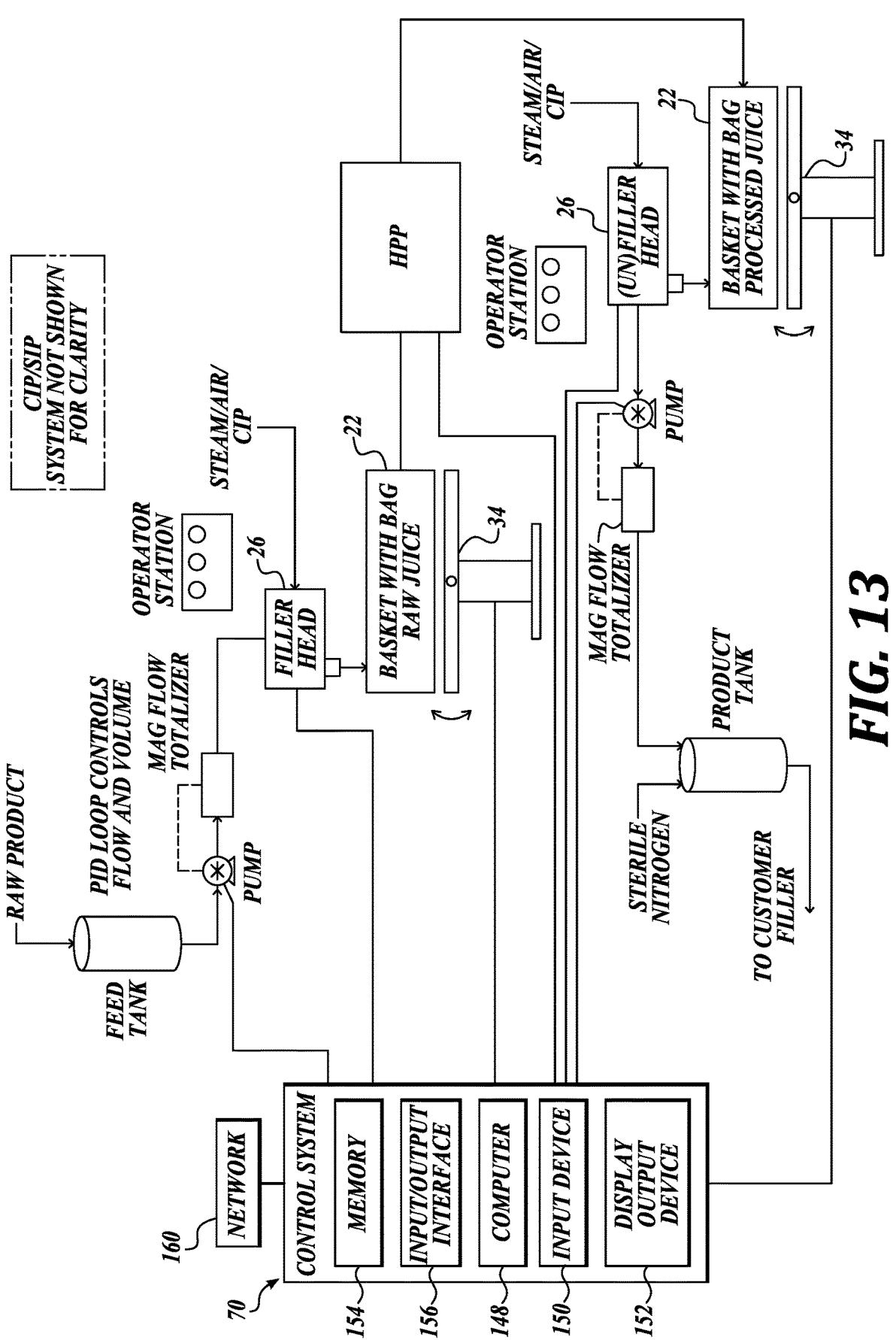
FIG. 13 is a flow diagram of an overall system for processing of flowable products using the present disclosure.

FIG. 13 illustrates an entire system for high pressure processing of the flowable product including storage tanks pumps in instrumentation. The carrier 22, flow control valve 26, and HPP press are shown as part of the overall system. The components of the system and the steps and system process are set forth in the text of FIG. 13.

Also, the control system 70 is shown in FIG. 13. In this regard, the control system 70 includes a computer or processor 148, an input device 150 (keyboard, mouse, touchscreen, etc.), and an output device 152 (touchscreen, monitored, printer, etc.). The control system 70 also includes a memory unit 154 and an input/output interface 156 for receiving and sending signals and information from and to the HPP press, the flow control valve 26, and the tilting table 120, among other components. The control system 70 may be connected to a network 160. Rather than employing the local control system 70, a network computing/control system can be used for this purpose.

Figure 14:
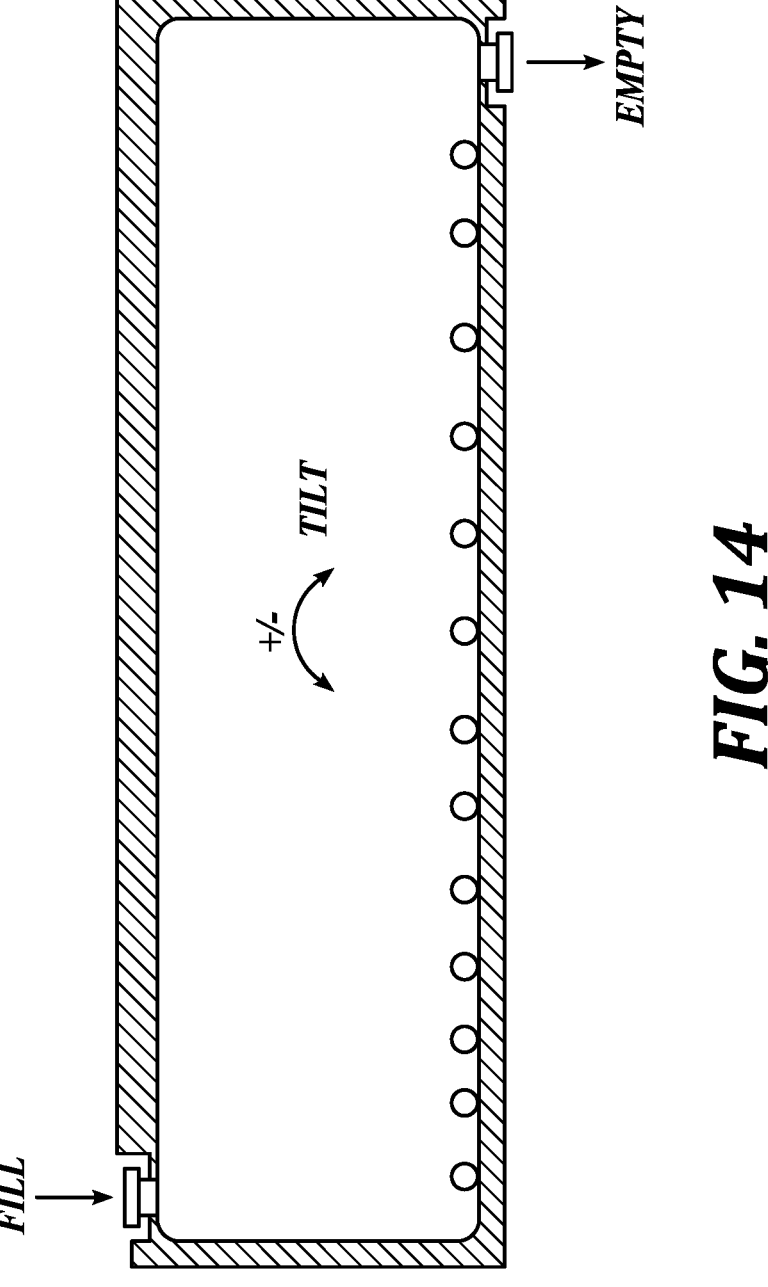
FIG. 14 shows another product bag for use in conjunction with the present system and method

While illustrative embodiments have been illustrated and described, it will be appreciated that various changes can be made therein without departing from the spirit and scope of the invention. For example, as shown in FIG. 14, the bag 20 can be fitted with fitments at opposite ends thereof, with one fitment used for primarily filling the bag and the other fitment used primarily for emptying the bag. In this regard, the fitment used to fill the bag can be located on the upper side of the bag, and the fitment used to empty the bag can be located on the underside of the bag. This configuration of bag can be used whether or not the bag is tilted to fill and empty.

Alternatively, both fitments can be used for both filling and emptying the bag. In this case, both fitments can be on the same side (upper) of the bag or on opposite sides of the bag. Further, when emptying the bag one fitment can be used for drawing the product from the bag and the second fitment can be used to pump an inert gas into the bag to help facilitate the emptying of the bag.

As noted above, two fitments can be located on the bag, with one fitment mounted to one panel of the bag and the second fitment mounted to the second panel of the bag to facilitate filling the bag and emptying the bag using the upper and lower nominally positioned fitments, respectively. However, one or more fitments can be positioned either adjacent to each other on one panel of the bag or at multiple locations about the panel of the bag for use in filling and/or emptying the bag at a faster rate than possible via the use of a singular fitment. In each of these situations, the bag is of the construction described above, which permits the bag to be disposed of rather than attempting to clean the bag so that the bag remains in hygienic condition.

Although the carrier 22 is illustrated as being of "open" construction with relatively large top openings 52 and 54, the carrier can be of other constructions. For example, the carrier can be constructed with fewer or smaller openings or can be substantially closed. In this situation, one or both of the ends of the carrier may be removable to facilitate placement of the bag 22 within the carrier as well as removal of the bag from the carrier. In such a closed configuration carrier, the one or more fitments of the bag may be accessible through openings formed in the carrier.

Figure 15:
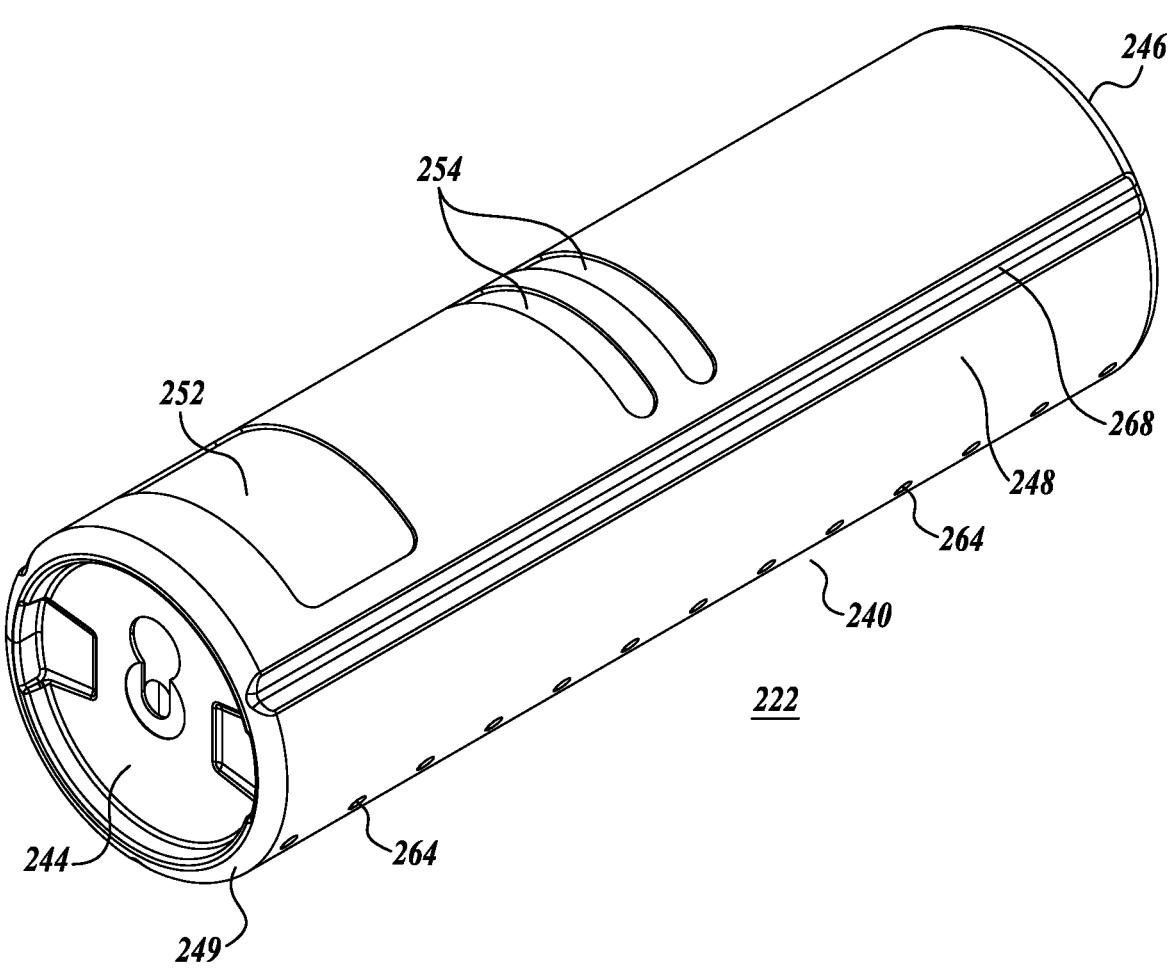
FIG. 15 illustrates another product carrier.
Figure 16:
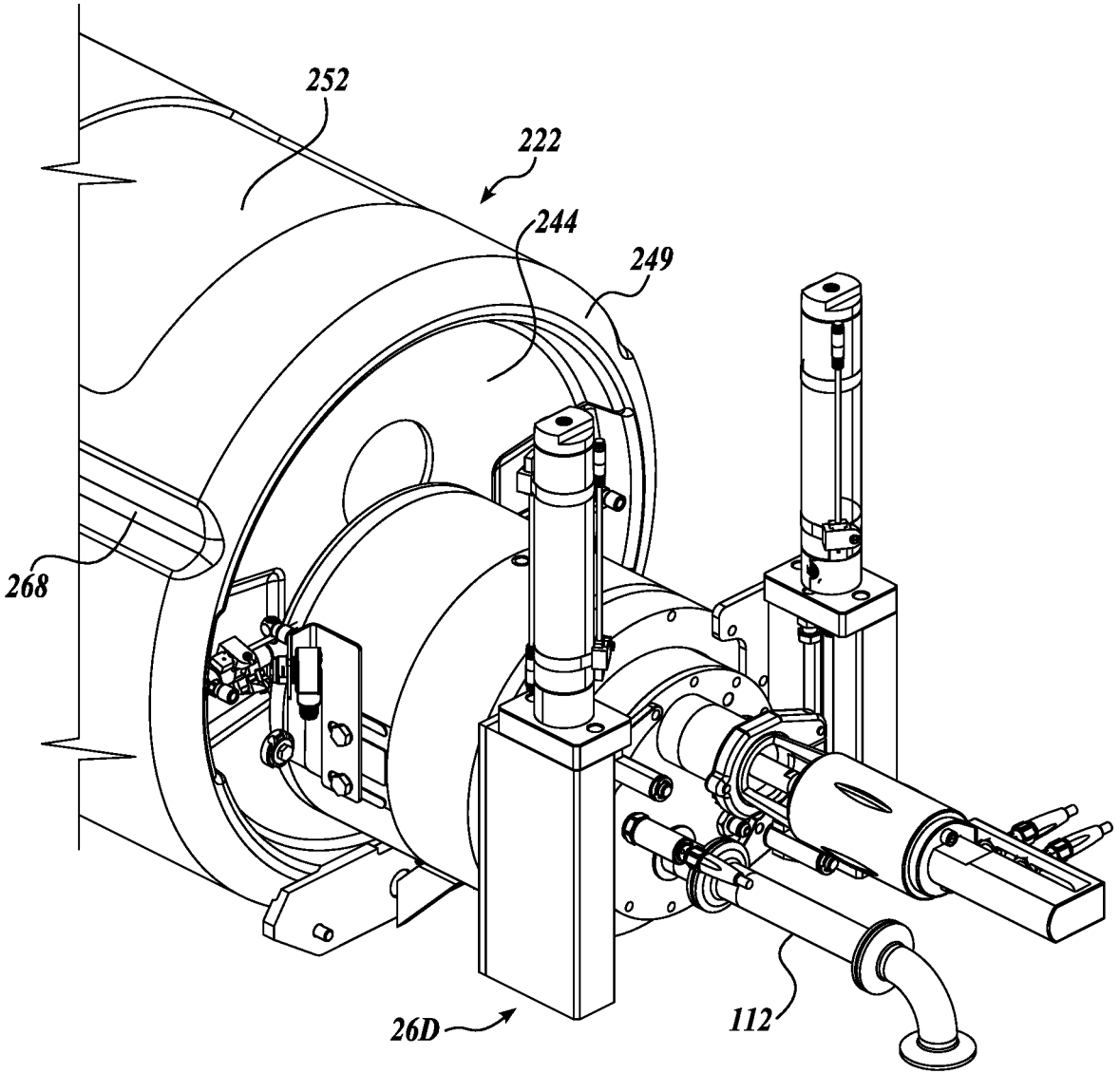
FIG. 16 is an illustration of another flow valve.

Next referring to FIGS. 15 and 16, another embodiment of a carrier 222 of the present disclosure is illustrated. Carrier 222 is constructed similarly to carrier 22 shown in FIG. 3, as well as described above. The components of carrier 222 that are similar or the same as the components of carrier 22 are identified with the same part number but in the 200 series. Further, many of the similar or same components are not redescribed here so as to avoid redundancy. Rather, the description above regarding carrier 22 also applies to carrier 222.

As in carrier 22, carrier 222 does include a generally cylindrical body 240 having first and second ends panels 244 and 246, as well as a curvilinear sidewall 248 extending there between. The cylindrical body 240 defines an interior volume 250 for receiving a collapsible, reusable liner bag, which may be similar to liner bag 20, suitable for bulk processing products.

One or both of the ends 244 and 246 of the carrier 222 may be recessed relative to the cylindrical body 240. A rim 249 extends around end of the cylindrical body to which the recessed end 244 is attached, as shown in FIGS. 15 and 16. The recess of the end 244 protects a fitment, such as fitment 90, that is positioned to the exterior of the body. Thus, even if the end of the carrier 222 abuts the end of other part of another carrier, the fitment will not be damaged.

The carrier body 240 may include a top opening 252 through which the liner bag may be inserted into and removed from the interior 250 of the carrier. Although not essential, the opening may be located at or near end panel 244.

Additional openings may be located in the carrier body 240, for example, transverse openings 254, which are shown as located intermediate the ends 244 and 246 of the carrier. These openings can facilitate processing medium from entering and exiting the interior of the carrier, provide visual access to the liner bag, and/or serve other purposes. Also, although two openings 254 are shown, a fewer number or a greater number of openings may be used.

Figure 17:
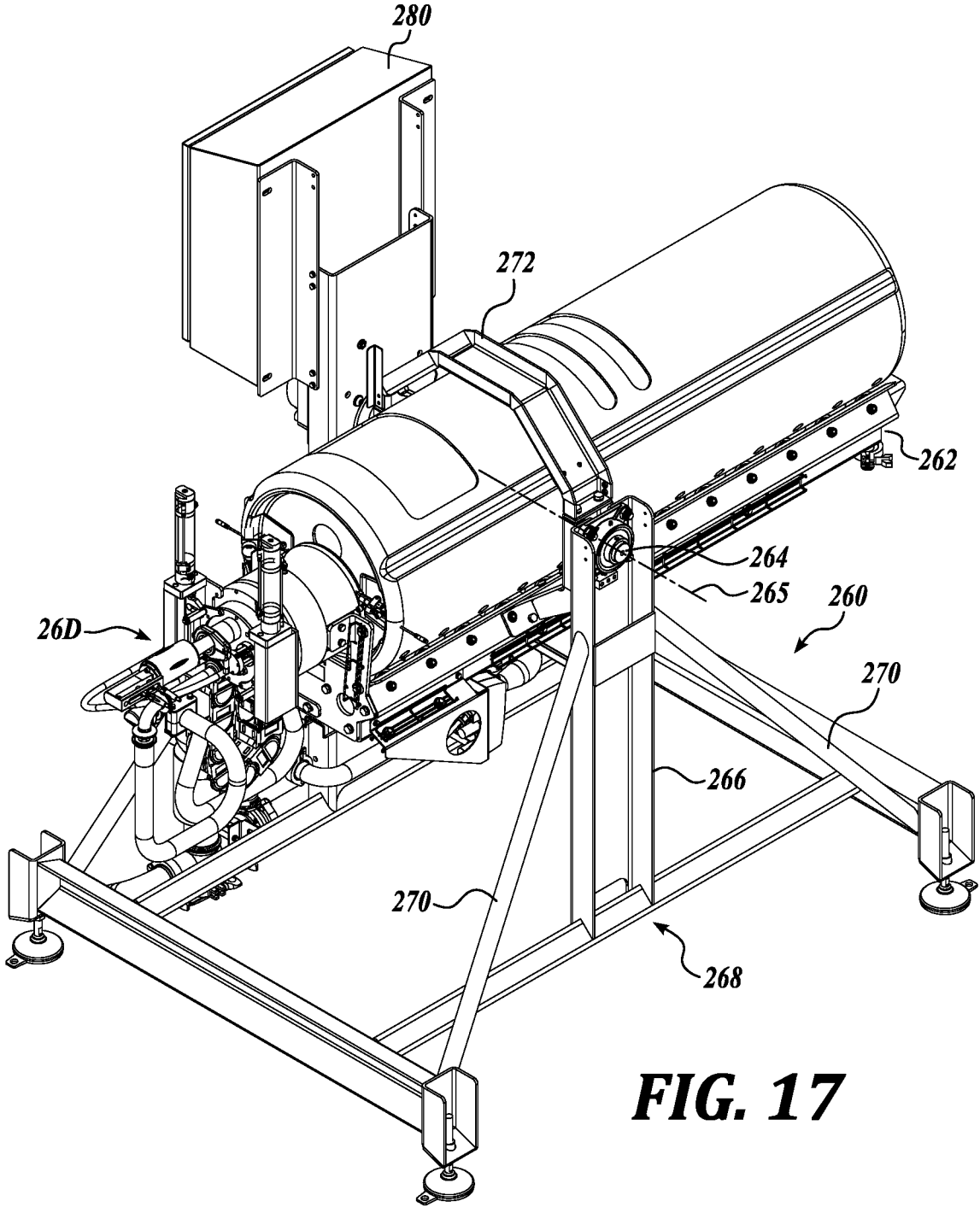
FIG. 17 illustrates another system for supporting and tilting the product carrier.

FIG. 17 illustrates the carrier 222 is mounted on a tilting table structure 260. The table structure 260 includes a longitudinal platform 262 on which the carrier 222 is supported. A series of rollers can be mounted along each side of the platform 262, as well as elsewhere along the platform for bearing against the exterior side portion of the carrier 222 for assisting in the loading and unloading the carrier from the table structure 260.

The platform 262 is pivotally mounted by bearings 264 about a transverse axis 265 to the upper ends of upright support posts 266 that extend upwardly from a base structure 268. Diagonal bars 270 extend from the corners of the base structure 268 to the upper ends of the support posts 266 for enhanced structural integrity of the table structure 260. A strap like structure 272 extends around the carrier 222 to interconnect the upper ends of the posts 266 also for the structural integrity of the table structure 260.

Figure 18:
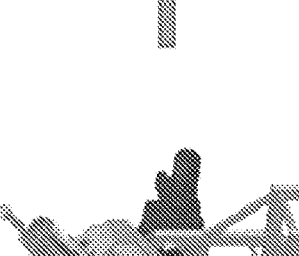
FIG. 18 shows an exemplary sequence of tilting the product carrier during the filling of the product bag.
Figure 18:
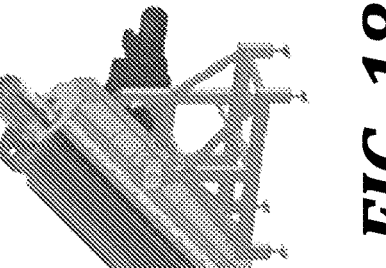
Figure 18:
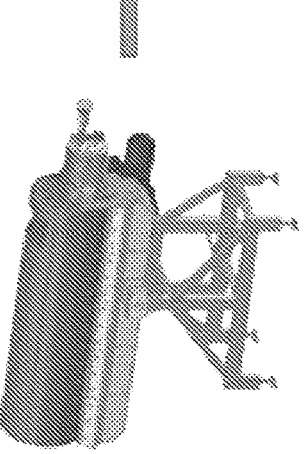
Figure 19:
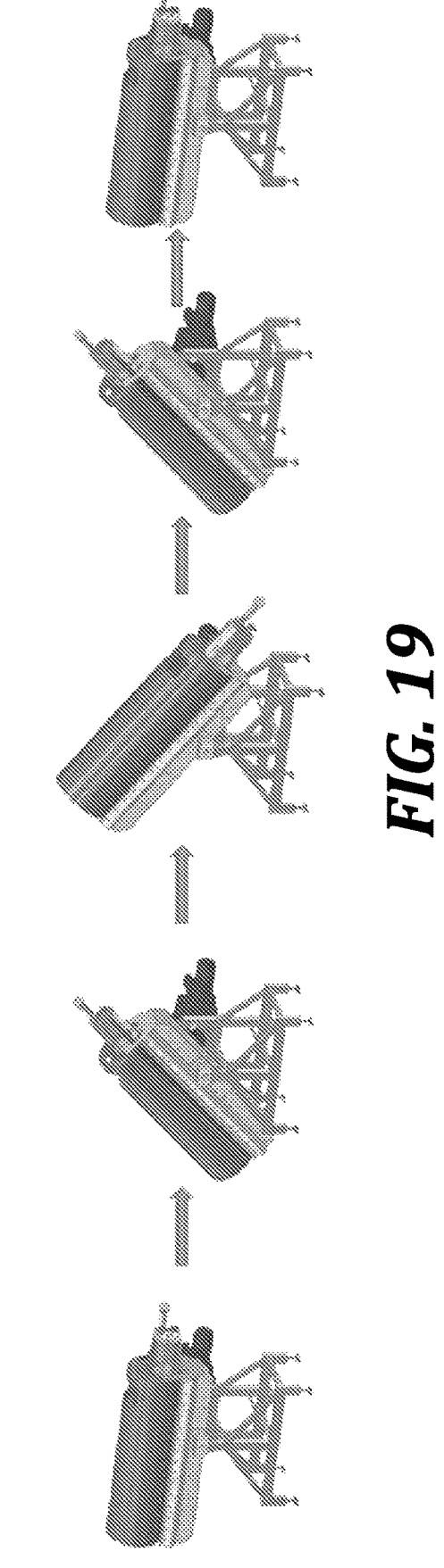
FIG. 19 shows an exemplary sequence of tilting the product carrier during the un-filling of the product bag.

A motor is provided to change the orientation of the platform 262 about axis 265. The control system 70, located in control housing 280, functions to control the operation of the motor and thus the tilt of the table platform 262 about axis 265. In this regard, as shown in FIG. 18, the table structure 260 can be tilted so that the fitment is raised relative to the bag when filling the bag. Also, as shown in FIG. 19, the table structure 260 can be tilted so that the fitment is raised relative to the bag to open the fitment and then lowered relative to the bag to empty the bag and the raised relative to the bag after emptying the bag to close the fitment. Of course, other sequences of the tilting of the table structure can be used when filling and/or un-filling the product bag.

The invention claimed is:

1. A system for high pressure processing of a bulk, flowable product in a high-pressure processing chamber configured to receive the product in carriers, comprising:
   a flexible, disposable, collapsible product holding bag sized for bulk processing of a flowable product, the bag having a fitment for filling and emptying the bag with the flowable product, the bag sized to be receivable within the carrier with the fitment positioned to be accessible for filling and emptying the bag while in the carrier;
   a flow connector to connect with the fitment during filling and emptying of the bag;
   a control system for controlling the filling of the bag through the flow connector and/or emptying the bag through the flow connector;
   a support for supporting the carrier in tilted orientation during the filling and emptying with the bag while disposed within the carrier; and
   wherein the control system alters the tilt of the bag as the bag is being filled and/or as the bag is being emptied.

2. The system of claim 1, wherein the fitment extends through an opening in the carrier for attachment to the flow connector.

3. The system of claim 2, wherein the fitment extends through an opening in an end of the carrier for attachment to the flow connector.

4. The system of claim 1, wherein the fitment is at an end of the bag.

5. The system of claim 1, wherein the support is tiltable relative to the horizontal.

6. The system of claim 1, wherein the control system tilts the support at any angle from between −90 to +90 degrees from the horizontal when filling or emptying the bag.

7. The system of claim 6, wherein the control system tilts the support at any angle from between −45 to +45 degrees from the horizontal when filling or emptying the bag.

* * * * *